United States Patent Office 3,518,186
Patented June 30, 1970

3,518,186
OLEOPHILIC GRAPHITE AND HEAVY METAL SULPHIDES IN COMPOSITES AND BEARINGS
George Inglis Andrews, Richmond, and Aleksander Jerzy Groszek and Rodney Ernest Witheridge, London, England, assignors to The British Petroleum Company Limited, London, England, a corporation of England
No Drawing. Filed Mar. 28, 1968, Ser. No. 718,982
Claims priority, application Great Britain, Apr. 5, 1967, 15,533/67
Int. Cl. C10m 5/18, 5/02
U.S. Cl. 252—12
1 Claim

ABSTRACT OF THE DISCLOSURE

Composites made from a metal or solid polymeric matrix especially a PTFE matrix, which incorporate also oleophilic graphite or oleophilic molybdenum disulphide are harder and wear better than corresponding composites containing ordinary graphite and molybdenum disulphide.

---

This invention relates to improved lubricating compositions, in particular it relates to composites of metals or solid polymeric materials with "oleophilic" solids and to bearings made from such composites.

It is known that certain solids, for example, molybdenum disulphide can be incorporated into, for example, polytetrafluoroethylene (PTFE). Certain techniques have been developed to incorporate such a solid into another, for example, a powder of a solid lubricant can be mixed with a powder of a plastic and the product compressed and sintered. The resultant material may be termed a "composite."

These composites can be formed in shapes suitable for use as self-lubricating bearings. For example, a metal-graphite bearing can be made by mechanically mixing metal and graphite powders, compressing the mixture (for example, at 70,000 p.s.i.), sintering the product and then machining to form a bearing.

Other examples of composites which are known are: nylon containing a high loading of a solid lubricant filler such as molybdenum disulphide or graphite. PTFE is particularly useful as a matrix for a solid lubricant since it has itself good lubricating properties. The metals suitable for forming the composite can be any of the normally used metals e.g. transition metals especially iron and its alloy, copper brass and aluminium.

The oleophilic solids of particular importance in the present invention are oleophilic graphite and oleophilic metal sulphides especially oleophilic molybdenum disulphide.

Oleophilic solids have a rato of heat of adsorption of n-dotriacontane from n-heptane to heat of adsorption of n-butanol from n-heptane of at least 1:1, and preferably at least 2:1.

Oleophilic graphite more preferably has a heat of adsorption of n-dotriacontane from n-heptane of at least 700 millicalories per gram and a heat of adsorption of n-butanol from n-heptane of less than 200 millicalories per gram.

The heats of adsorption can be measured using a flow Microcalorimeter as described in Chemistry and Industry Mar. 20, 1965, pp. 482–489.

Oleophilic solids which may be used are oleophilic molybdenum disulphide, oleophilic graphite, oleophilic intimate mixtures of graphite and sulphur-containing materials, oleophilic tungsten disulphide, "modified" oleophilic graphite and oleophilic tin sulphides. These oleophilic materials are prepared by grinding the starting material, for example, natural or synthetic graphite, in a low boiling point, low viscosity, low surface tension organic liquid, as far as possible in the absence of air. In the case of the "modified" oleophilic graphite the grinding fluid contains in addition a polymer.

Oleophilic graphite can also be prepared by grinding graphite in water in the presence of a water soluble compound containing a long chain hydrocarbon group.

It has now been found that composites containing at least one of the oleophilic solids as described above have superior physical properties to composites containing non-oleophilic solids.

It has further been found that bearings fashioned from the composites according to the invention have superior self-lubricating and load-carrying properties to bearings fashioned from composites containing non-oleophilic solids.

This invention, therefore, provides composites which comprises a metal or a solid polymeric matrix containing at least one oleophilic solid as defined above.

The amount of oleophilic solid incorporated into the metal or solid polymeric matrix may be as low as 0.1 and as high as 50% wt. but is preferably from 1 to 25% wt. based on the weight of matrix plus oleophilic solid.

The oleophilic solids can be incorporated into the metal or solid polymeric matrix by any suitable method. However, they are preferably incorporated into the matrix by the mechanical mixing of either wet or dry powders of the metals or solid polymeric materials with either wet or dry powders of the oleophilic solids. It is preferred to mix the powders wetted with a volatile solvent such as petroleum ether. It is convenient to use an ultrasonic vibrator or ball mill to produce a slurry blend of the powders. The mixture may then be compressed, for example, in a die, after removal of any solvent, and sintered at a suitable temperature, for example, above 327° C. for a composite comprising a PTFE matrix.

The more homogenous the dispersion of the oleophilic solids in the polymer or metal matrix the better the reinforcing properties of the oleophilic solids, and mixing of the solids should be adequate to ensure a good dispersion.

If sufficient of an electrically conductive oleophilic solid is added to a non-conductive polymer then the polymer can be rendered electrically conductive.

This invention also relates to bearings fabricated from composites which comprise a metal or a solid polymeric matrix containing at least one oleophilic solid as defined above.

The following examples serve to illustrate the invention.

EXAMPLE 1

The oleophilic graphites were prepared by grinding commercially available graphite for 8 hours in an organic liquid. A "Megapact Mark II" vibratory ball mill was used. The slurry of oleophilic graphite was removed from the mill. The liquids used and the properties of the oleophilic graphite (1) and (2) obtained are shown in Table 1.

A commercially available PTFE powder was passed through a 12 mesh sieve (1.405 mm.).

10 g. of the oleophilic graphite in a slurry with 40 g. of a petroleum ether boiling between 40 and 60° C. and 40 g. of the sieved PTFE were placed in a 250 ml. beaker. The slurry and PTFE powder were mixed using an ultrasonic vibrator head.

The organic liquid was evaporated in a stream of air from the slurry. The powder obtained was then broken up and dried in a vacuum oven for 24 hours. The powder was then passed through a 12 mesh sieve and dried for a further 24 hours.

After drying, the powder was again sieved through a 12 mesh sieve. 2 g. of this powder was preformed in a die at a pressure of from 11 tons in $^{-2}$. The preform was then "free-sintered" in an oven at 380° C. for 1½ hours. The oven was then allowed to cool to room temperature and the composite removed. The properties of the product are shown in Table 2.

Comparison Example 1

20% of a commercially available graphite powder was incorporated into PTFE by stirring the graphite and PTFE powders into petroleum ether using an ultrasonic vibrator and proceeding as in Example 1.

Comparison Example 2

A graphite powder was prepared by grinding a commercially available graphite powder for 8 hours in a "Megapact Mark II" vibratory ball mill in air.

20% of the graphite was incorporated into PTFE by stirring the graphite and PTFE powders into petroleum ether using an ultrasonic vibrator and proceeding as in Example 1.

EXAMPLE 2

Oleophilic molybdenum disulphide was prepared by grinding a commercially available molybdenum disulphide for 8 hours in petroleum ether. A "Megapact Mark II" vibratory ball mill was used. The oleophilic molybdenum disulphide obtained had a surface area of 42 m.$^2$/g.

10% of the oleophilic molybdenum disulphide was incorporated into PTFE as described in Example 1.

Comparison Example 3

10% of a commercially available molybdenum disulphide powder (Acheson "Dag 325") was incorporated in PTFE by stirring the molybdenum disulphide and PTFE powders into petroleum ether using an ultrasonic vibrator and proceeding as in Example 1.

TABLE 1

| Filler | Grinding fluid | Time of grinding, hours | Surface area, m.$^2$/g. |
|---|---|---|---|
| Graphite (1) | Petroleum ether 60/80 [1] | 8 | 100 |
| Graphite (2) | Perfluoro-methyl cyclohexane | 8 | 94 |
| MoS$_2$ (3) | Petroleum ether 60/80 | 8 | 42 |

[1] A petroleum ether boiling between 60 and 80° C.

The properties of the composites produced are shown in Table 2. Graphites (1) and (2) refer to the oleophilic graphites produced as in Table 1, the composites being fabricated as in Example 1.

The composite containing commercially available graphite powder was made as in comparison Example 1, the composite containing air ground graphite was made as in comparison Example 2, the composite containing unground graphite was made as in Example 1 using a graphite powder and the composite containing graphite* refer to a commercially available PTFE/graphite composite.

MoS$_2$ (3) refers to the oleophilic MoS$_2$ produced as in Table 1, the composite containing MoS$_2$* refers to a commercially available PTFE/MoS$_2$ composite, and the composite containing unground MoS$_2$ was made as in comparison Example 3.

TABLE 2

| Filler | Percent filler in composite | Hardness R | Wear, K×10$^{-13}$ | Resistance, ohm cm. |
|---|---|---|---|---|
| Graphite (1) | 25 | 72 | 9.0 | 10 |
| Graphite* | 25 | 79 | 20.2 | |
| C1—Unground graphite | 25 | 37 | 6.5 | 75 |
| C2—Air ground graphite | 20 | 63 | | |
| C1—Commercial graphite powder | 20 | 69 | | |
| Graphite (2) | 15 | 86 | 8.0 | 18 |
| Unground graphite | 15 | 68 | 26.7 | 108 |
| MoS$_2$ (3) | 10 | 86 | 86.1 | |
| MoS$_2$* | 10 | 73 | 110.1 | |
| C3—Unground MoS$_2$ | 10 | 70 | 136.4 | |
| None | | 69 | 527 | 00 |

(1) The modified Rockwell hardness was measured on a standard Rockwell hardness test machine except that the diamond point was repaced by ½ inch steel ball bearing. The load applied was 31.2 kg.

(2) The wear value was measured on a modified pin-on-disc machine, wherein the pin was a pellet of composite sliding on a steel disc rotated at 116 feet min.$^{-1}$ under 2 kg. load for 10 minutes. Three edges of each pellet were examined and the result given is a mean of the three values obtained. The volume of material removed is measured, and using the equation $$w = kmvt$$

where $w$ = volume worn in time+
$m$ = the applied load
$v$ = relative velocity of the contacted surfaces and the relative values of $k$ for different composites determined.

In the Table C1, C2 and C3 refer to the respective comparison examples.

It can be seen that the composites containing graphites (1) and (2) have either better hardness or better wear than the other composites containing graphite. The only composite having better wear value having a lower hardness value and the only composite having better hardness having high wear value. The composites of the invention containing MoS$_2$ (3) being superior in both respects to the other MoS$_2$ containing composites.

What we claim is:

1. A reinforced polytetrafluoroethylene composite consisting essentially of 0.1 to 50% by wt. of a reinforcing oleophilic compound selected from the group consisting of graphite and molybdenum disulphide incorporated into a polytetrafluoroethylene matrix, said composite formed by grinding the reinforcing compound in an organic liquid distilling below 500° C., having a viscosity below 600 centistokes at 100° F., and having a surface tension below 72 dynes/cm. at 25° C., recovering a solid oleophilic compound therefrom, mixing said oleophilic compound with polytetrafluoroethylene, compressing the mixture and sintering the compressed mixture to produce the reinforced polytetrafluoroethylene composite.

References Cited

UNITED STATES PATENTS

| Re. 26,088 | 9/1966 | Rulon-Miller et al. | 252—12 |
| 2,400,099 | 5/1946 | Brubaker et al. | 252—12 |
| 3,234,128 | 2/1966 | McLeich et al. | 252—12 |

DANIEL E. WYMAN, Primary Examiner

I. VAUGHN, Assistant Examiner